United States Patent [19]

Federspiel

[11] 3,796,502
[45] Mar. 12, 1974

[54] QUICK LATCH COUPLING
[75] Inventor: Joseph A. Federspiel, Port Washington, Wis.
[73] Assignee: FMC Corporation, San Jose, Calif.
[22] Filed: Sept. 14, 1970
[21] Appl. No.: 71,784

[52] U.S. Cl. .................. 403/106, 285/317, 403/322
[51] Int. Cl. ............................................. F16b 7/00
[58] Field of Search........... 287/119 R, DIG. 13, 53, 287/58 CT; 279/76, 77; 285/317; 248/408

[56] References Cited
UNITED STATES PATENTS

| 2,965,382 | 12/1960 | Schlage | 279/77 |
| 3,177,976 | 4/1965 | Wenzel | 287/58 CT X |
| 3,252,721 | 5/1966 | Weasler | 287/119 R |
| 2,592,978 | 4/1952 | Trimboli | 81/177.2 |
| 750,173 | 1/1904 | Decker | 287/58 X |
| 1,269,413 | 6/1918 | Finnigan | 287/119 R |
| 2,221,371 | 11/1940 | De Bethune | 287/119 R |

FOREIGN PATENTS OR APPLICATIONS

| 320,093 | 10/1929 | Great Britain | |
| 19,177 | 1914 | Great Britain | 248/408 |

Primary Examiner—Andrew V. Kundrat
Attorney, Agent, or Firm—A. J. Moore; C. E. Tripp

[57] ABSTRACT

A hand operated coupling especially useful in connecting the driveshafts of various implements to the power takeoff shaft of a garden tractor, and capable of being incorporated with a positive drive connection and a universal joint for positive power transmission between misaligned or relatively movable driving and driven shafts.

6 Claims, 6 Drawing Figures

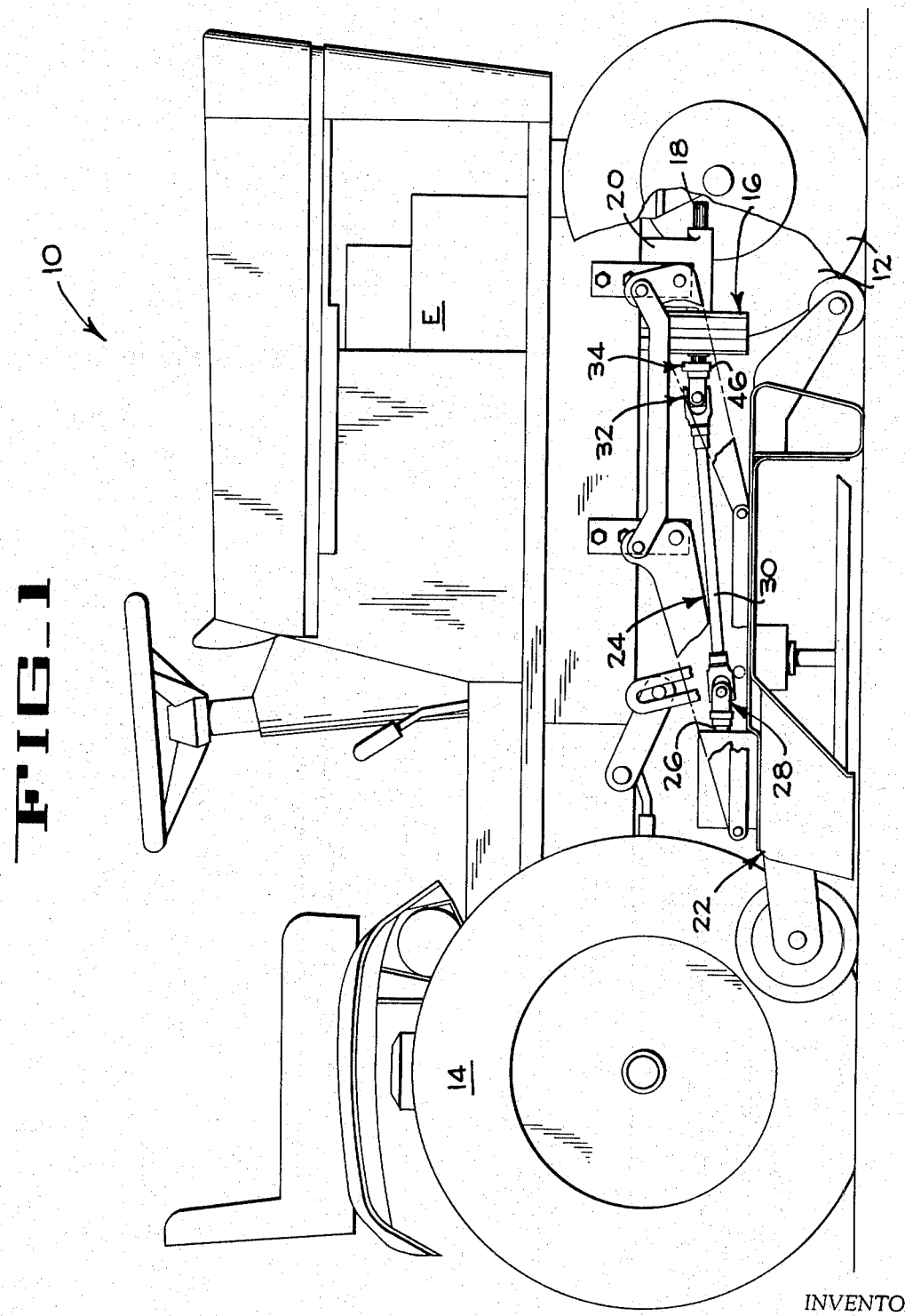

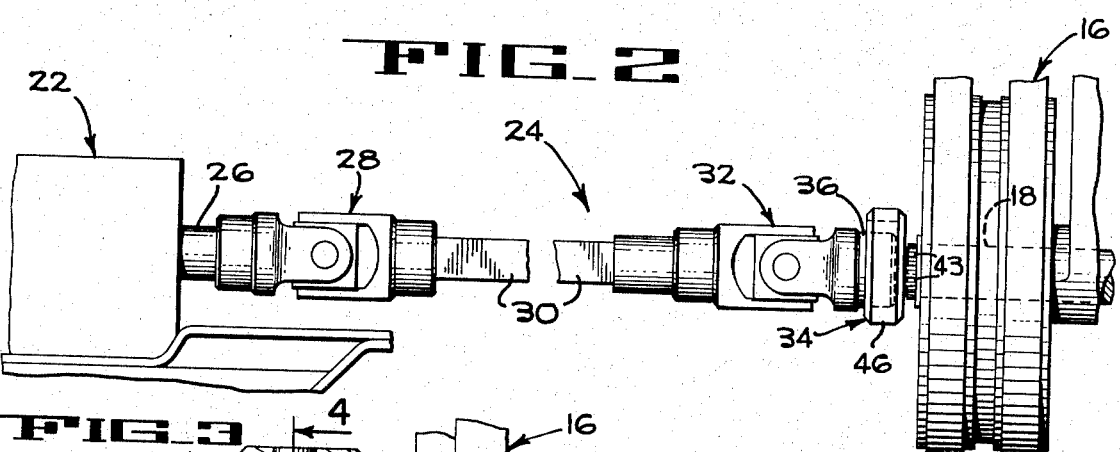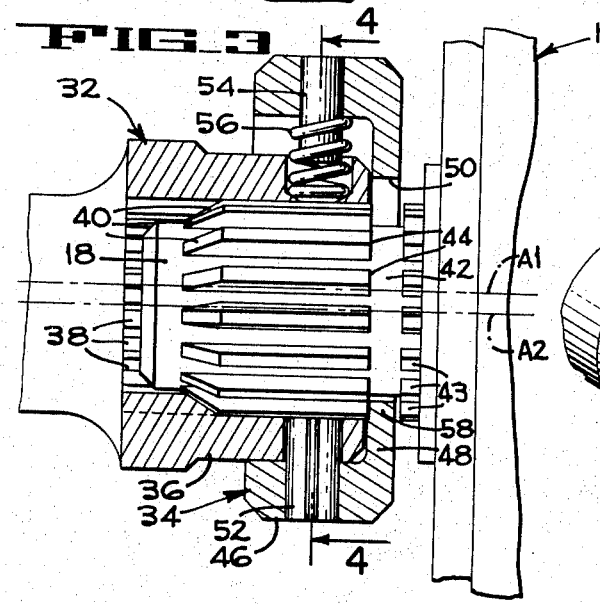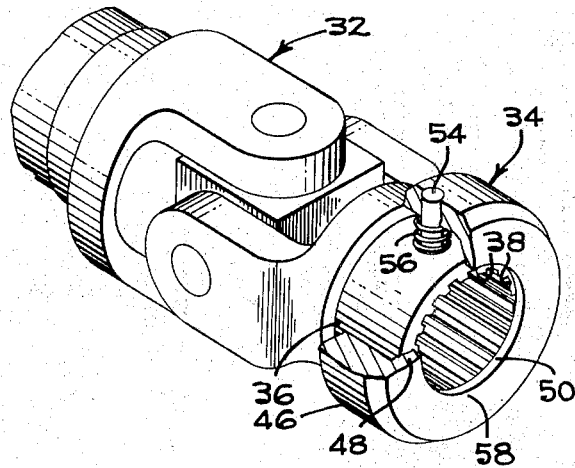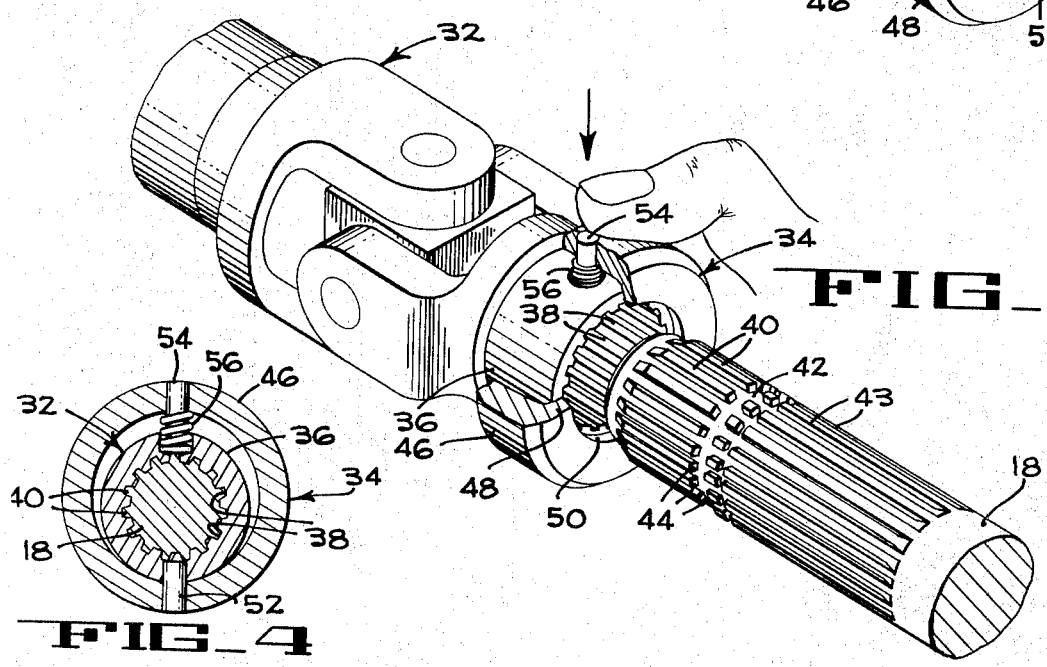

QUICK LATCH COUPLING

BACKGROUND OF THE INVENTION

The field of the present invention concerns mechanical shaft couplings for transmitting driving torque between driving and driven shafts.

Prior art coupling devices of the type used with small tractors include those which require the insertion of a pin in manually and visually aligned holes of the driving shaft and coupling. Other prior art couplings might eliminate visual alignment, but require two-hand operation, or have hazardous projections which can cause injury to the operator and snag wire or similar material which can wind around the coupling and driveshaft. Still other couplings might facilitate one-hand operation, but are relatively complex and expensive to produce, or cannot be made in a convenient size to power heavy duty implements. Another type of coupling which is rotatively actuated is prone to unlatch from centrifugal force if the driving torque is interrupted by temporary stopping of the driven implement. Each of these prior art devices, in other words, has been directed to a problem long standing in the art, but each has one or more disadvantages which make it less than totally efficient for its required function.

Two examples of prior art rapid couplings are disclosed in the U.S. Recker Pat. Nos. 2,948,559 and 3,179,450, wherein rotation of an outer part of each coupling in one direction opens an internal latch permitting insertion or removal of a splined shaft. Each of these patented couplings is characterized by a certain degree of complexity, and one hand operation does not appear convenient because two combined but separate movements are necessary for a coupling operation, that is, rotative and endwise movements.

The quick latch coupling of the present invention is of notably simple, compact and lightweight construction, and facilitates one hand operation because it operates by a radial gripping force to open or close its internal latch. Since a gripping force is first necessary to position any type of coupling shaft endwise, the quick latch coupling of the present invention enables true one-hand operation.

SUMMARY OF THE INVENTION

The results achieved by the coupling of the present invention are (1) a compact and inexpensive drive line coupling capable of being incorporated with a universal joint, (2) a coupling which requires no rotative alignment and can be coupled without visual observation, (3) a coupling capable of one-hand operation, (4) a coupling requiring no tools or loose auxiliary parts, (5) a simplified coupling having ample locking surfaces for resisting relatively strong thrust loads, and (6) a coupling providing a smooth exterior to both prevent snagging an operator's clothing and wrap-around of debris.

By providing a radially displaceable, spring biased collar having an annular flange overlying the open end of a splined coupling hub, a sector of the rim defining the aperture of the collar is biased into an annular groove in a splined power shaft seated in the hub for locking the shaft endwise. Positioning the collar coaxial with the shaft by radially displacing the collar frees the flange rim from the shaft groove and allows the splined coupling hub to be removed from, or installed upon, the splined power shaft.

BRIEF DESCRIPTION OF THE DRAWING

FIG. 1 is a side elevation of a garden tractor employing the quick latch coupling of the present invention to power a mowing implement.

FIG. 2 is an enlarged elevation of the coupling shaft assembly shown in FIG. 1.

FIG. 3 is an enlarged longitudinal section of the quick latch coupling of the present invention.

FIG. 4 is a transverse section taken along lines 4—4 on FIG. 3.

FIGS. 5 and 6 are enlarged perpsectives of the quick latch coupling respectively illustrating the free condition of the coupling, and the actuation of the coupling for attachment to or removal from a power shaft.

DESCRIPTION OF THE PREFERRED EMBODIMENT

FIG. 1 illustrates, only as an exemplary environment for the present invention, a typical garden tractor 10 supported by steerable front wheels 12 and driven rear wheels 14 powered by an engine E. A belt and pulley drive train 16 to the engine is selectively controllable by the operator for driving a power takeoff shaft 18. The power takeoff shaft extends both forward and rearward of a support bracket 20 for driving implements mounted ahead of the front wheels 12, or implements mounted between the front and rear wheels, or implements which trail the rear wheels 14. In each case, each separate implement, such as the illustrated rotary mower 22, usually requires an individual driveshaft assembly 24 because the distance between the input shaft 26 (FIG. 2) of the implement and the power takeoff shaft 18 varies.

A typical driveshaft assembly 24 for shaft-driven implements may include a universal joint 28 at one end which is fixed to the input shaft 26 of the implement, a length of shafting 30, and a second universal joint 32 at the other end of the assembly for coupling to the power takeoff shaft 18 of the tractor. In the present instance, the universal joint 32 is an integral part of the quick coupling latch 34 of the present invention.

For driving engagement with the driveshaft assembly 24, a cylindrical hub 36 of the universal joint 32 is provided with internal splines 38 (FIGS. 3–6). Matching splines 40 (FIG. 6) are provided on the end portion of the power takeoff shaft 18, interrupted by an annular locking groove 42 which is formed by the confronting end surfaces of the adjacent longitudinally aligned splines. Splines at 43, inward of the groove 42, are provided for mounting the drive pulleys of the belt and pulley drive train 16.

It is important to note that only the radial end walls at 44 of the outermost splines are essential. Thus, the power takeoff shaft 18 can function, according to the present inventive concept, if it is smooth and has radially projecting end splines. Also, only the hub 36 of the universal joint 32 is an essential part of the quick latch coupling, but the hub splines 38 are not essential if some other positive torque connection is used, such as a square socket in the hub to receive a power takeoff shaft having a square end.

The quick coupling latch 34 includes a locking collar or annulus comprising a cylindrical body 46 provided with a radial, apertured annular flange 48. The body 46 is provided with an internal diameter larger than the outside diameter of the hub 36 to permit radial displacement of the collar relative to the hub, and the flange 48 has an axial extent less than the width of the locking groove 42 so that it can seat within the groove. The circular aperture 50 of flange 48 is slightly larger than the major diameter of the hub splines 40 in order that the flange can slide over the power takeoff shaft 18.

The locking collar body 46 (FIGS. 3 and 4) is mounted for axial retention, coextensive rotation and limited radial movement on the cylindrical hub 36 by a radial locking pin 52. Pin 52 is secured in an aperture in the locking collar body 46 and extends with a small clearance into the hub of the universal joint 36. Diametrically opposite the locking pin 52 is a spring mounting stud 54 which extends inward from the body 46 and into a compression spring 56. A socket for the spring is formed in the hub 36, and the spring biases the body 46 toward axial misalignment with the hub 36.

The central axis A1 (FIG. 3) of the locking collar body 46 can be positioned coaxial with the central axis A2 of the internally splined hub 36, against the bias of the compression spring 56. Thus aligned, the internal splines 38 of the hub 36 are exposed for insertion of the splines 40 of the power takeoff shaft 18. When the power takeoff shaft is coupled, and the axes A1 and A2 are not aligned, a flange sector at 58 (FIGS. 3 and 5) of the flange 48 is seated within the groove 42 in the power takeoff shaft 18. The coupling latch 34 is thus locked because the flange sector 58 lies in blocking relation with the spline end walls 44. This prevents relative axial separating movement of the power takeoff shaft 18 and the universal joint 32, while the splined interconnection transmits driving torque to the rotary mower 22, or whatever other implement may be in use.

FIGS. 5 and 6 clearly illustrate the simplicity of the coupling latch 34 and the one-hand operation it affords. In its FIG. 5 position, the flange 48 of the latch is radially offset from the splined hub 36, or in other words is in its spring-biased, normally latched condition. To couple the driveshaft assembly 24 to the power takeoff shaft 18, the coupling latch 34 is grasped with radial pressure applied to the locking collar body 46, as shown in FIG. 6, in order to shift the body and make the axes A1 and A2 (FIG. 3) coincident. The internal hub splines 38 are thus free to receive the adjacent splines 40 of the power takeoff shaft 18, and the collar body 46 is slid over the shaft 18.

The collar body may be released during the coupling operation when the wall of the aperture 50 of the flange 48 can be radially supported by the power takeoff shaft splines 40, and the flange sector 58 will thereafter snap into the shaft groove 42 to lock the universal joint 32 onto the power takeoff shaft 18. Dismounting the driveshaft assembly 24 is accomplished by merely radially shifting the locking collar body 46 and moving the mover universal joint 32 to slide the body 46 off the power takeoff shaft 18.

It will be noted that the shaft splines 40 (FIG. 3) are inwardly offset from the end of the shaft 18, and that both the shaft and splines are beveled. This allows a coupling action to be made without manually displacing the collar 46. Thus, it is merely necessary to insert the beveled end of the shaft 18 into the aperture 50 of the flange 48, align the splines 38 and 40, and push the hub and shaft together. Part of the beveled shaft splines 40 act as a cam to radially displace the collar 46, and the collar snaps into the locking groove 42 when the proper axial relation of the flange 48 and groove 42 occurs.

From the preceding description, it will be apparent that the quick coupling latch 34 can be readily engaged or disengaged with one-hand operation and without visual alignment or tools, is compact, simple, and totally self contained in a smooth surfaced and non-hazardous enclosure. Further, the coupling retains the advantages of a positive drive interconnection with the above noted features, and will not unlock even if the implement being driven is suddenly stopped by accident, or if the power is temporarily interrupted. It should also be noted that the direction of power application can be reversed, that is, the hub 36 can be driven instead of the shaft 18, and the direction of rotation can also be reversed without affecting the transfer of power through the coupling.

It is believed evident that the disclosed environment of the quick coupling latch 34 of the present invention illustrates only one useful application of the coupling latch, and that the coupling latch is broadly useful for providing interengagement of driving and driven shafts in a broad range of other uses and torque requirements.

Although the best mode contemplated for carrying out the present invention has been herein shown and described, it will be apparent that modification and variation may be made without departing from what is regarded to be the subject matter of the invention.

What is claimed is:

1. A quick coupling assembly comprising an internally splined cylindrical hub having an open end, an annular collar circumscribing said hub, said collar having an internal diameter slightly larger than said hub, an annular flange formed on said collar and extending across said open end of said hub, said flange having an internal diameter larger than the maximum diameter of said splines, mounting means for said collar including a radially extending locking pin secured to said collar and extending inward through an aperture in said hub, a compression spring intermediate said hub and said collar in opposed relation to said locking pin, and a splined shaft having an annular groove for receiving an inner sector of said flange when the shaft splines are fully engaged with the hub splines.

2. A hand-operated coupling assembly comprising a shaft having splines with beveled ends spaced from the end of said shaft and an interrupted portion to provide an annular locking groove spaced from said beveled ends, an interiorly splined open end hub arranged to receive the splined end of said shaft, a locking collar on said hub including an apertured radial wall overhanging the open end of said hub, means mounting said locking collar for limited radial movement on said hub, the beveled end of said splines coacting with the radial wall surface defining said aperture to cam said locking collar radially aside when said shaft is inserted in said hub, and means radially biasing said collar to automatically seat said radial wall in said locking groove following said insertion.

3. A quick coupling assembly comprising an internally splined cylindrical hub having an open end, an annular flange mounted on said hub across said open end, said flange having an internal diameter larger than the maximum diameter of said splines, a splined shaft having an annular groove for receiving an inner sector of said flange when the shaft splines are fully engaged with the hub splines, resilient means radially biasing said flange toward an axially misaligned position relative to said hub to position said flange sector in said annular groove and prevent relative axial movement between said coupling assembly and said shaft while the interengaged splines transmit driving torque, said flange is formed on an annular collar circumscribing said hub, said collar having an internal diameter larger than the outside diameter of said hub, mounting means for said collar including a radially extending locking pin secured to said collar and extending inward through an aperture in said hub, said resilient means comprising a compression spring intermediate said hub and said collar in opposed relation to said locking pin, a spring mounting and retaining stud extending inward through said spring from the inner wall of the collar, and a spring socket formed in the outer wall of the hub in alignment with said stud.

4. A coupling for detachably connecting a shaft having a longitudinal axis to a rotary member comprising: a hub on said rotary member for receiving a connecting portion of the shaft when axially inserted therein; means defining complimentary torque transmitting surfaces on said hub and on said portion of said shaft; means defining an abutment wall on said portion of said shaft extending transversely of said shaft; a symmetrical cylindrical locking collar surrounding a portion of said hub having a central axis and a smooth unobstructed cylindrical outer wall slightly larger in diameter than said portion of said hub; means mounting said collar on said hub for limited rectilinear movement transversely of said shaft between a substantially concentric position and an eccentric position relative to said shaft; an annular wall engaging means integral with said collar and having a circular opening concentric with said collar disposed in position for engaging said abutment wall to preclude disengagement of the shaft and said coupling when said collar is in its eccentric position, said wall engaging means being disposed out of engagement with said abutment wall when said collar is shifted to said substantially concentric position; resilient means disposed between the collar and said hub and operable for applying a resilient force radially of said shaft for normally holding the collar in said eccentric position, said locking collar and said wall engaging means when in their eccentric positions having their common central axis disposed on the same side of the longitudinal axis of the shaft toward which the resilient force acting on the collar is directed.

5. An apparatus according to claim 4 wherein said abutment wall is one wall of a transverse groove formed in said connecting portion of said shaft.

6. An apparatus according to claim 4 wherein said collar has an overall axial dimension which is shorter than the diameter of the shaft.

* * * * *